United States Patent
Park et al.

(10) Patent No.: US 8,983,422 B2
(45) Date of Patent: Mar. 17, 2015

(54) METHOD FOR SELF-CALLING AND EMERGENCY REPORTING WITH MOBILE TERMINAL, SYSTEM THEREOF, AND RECORDING MEDIUM STORING THE SAME

(75) Inventors: Min Soo Park, Yongin (KR); Jun Hyun Park, Seoul (KR)

(73) Assignee: S1 Corporation (KR)

( * ) Notice: Subject to any disclaimer, the term of this patent is extended or adjusted under 35 U.S.C. 154(b) by 129 days.

(21) Appl. No.: 13/514,715

(22) PCT Filed: Jan. 22, 2010

(86) PCT No.: PCT/KR2010/000406
§ 371 (c)(1),
(2), (4) Date: Aug. 21, 2012

(87) PCT Pub. No.: WO2011/071210
PCT Pub. Date: Jun. 16, 2011

(65) Prior Publication Data
US 2013/0005295 A1    Jan. 3, 2013

(30) Foreign Application Priority Data
Dec. 11, 2009 (KR) .......................... 10-2009-0123042

(51) Int. Cl.
*H04M 11/04* (2006.01)
*H04W 4/22* (2009.01)
*H04W 76/00* (2009.01)

(52) U.S. Cl.
CPC .............. *H04W 4/22* (2013.01); *H04W 76/007* (2013.01)
USPC ................... 455/404.1; 455/404.2; 455/414.1; 455/418; 455/456.6

(58) Field of Classification Search
CPC ...... H04W 4/22; H04W 76/007; H04W 12/06; H04W 4/003
USPC .............. 455/404.1, 404.2, 414.1, 418, 456.6
See application file for complete search history.

(56) References Cited

U.S. PATENT DOCUMENTS

| | | | | |
|---|---|---|---|---|
| 7,512,223 | B1 * | 3/2009 | Albal et al. | 379/207.12 |
| 7,529,677 | B1 * | 5/2009 | Wittenberg | 704/275 |
| 8,630,820 | B2 * | 1/2014 | Amis | 702/186 |
| 2005/0201358 | A1 * | 9/2005 | Nelson et al. | 370/352 |
| 2006/0003809 | A1 * | 1/2006 | Boling et al. | 455/564 |
| 2006/0073806 | A1 * | 4/2006 | Jenkins | 455/404.1 |

(Continued)

OTHER PUBLICATIONS

International Search Report PCT/KR2010/000406 dated Dec. 14, 2010.

*Primary Examiner* — Kashif Siddiqui
*Assistant Examiner* — Mong-Thuy Tran
(74) *Attorney, Agent, or Firm* — Lerner, David, Littenberg, Krumholz & Mentlik, LLP

(57) ABSTRACT

A method of self-calling and emergency reporting using a mobile terminal, and a system thereof, are provided. The method includes: when a particular pattern of a user is inputed to a mobile terminal, and the particular pattern is authentication data previously inputed by the user, changing a mode of the mobile terminal to a self-reception mode previously determined by the user; outputting a query previously stored in a database to the user through the mobile terminal to perform voice recognition; executing a policy previously stored in the database according to the user's voice recognition and a response pattern according to the query; and changing a mode of the mobile terminal to a standby mode when a personal identification number for termination is input.

20 Claims, 8 Drawing Sheets

(56) References Cited

U.S. PATENT DOCUMENTS

| | | |
|---|---|---|
| 2006/0258376 A1 | 11/2006 | Ewell |
| 2006/0284969 A1* | 12/2006 | Kim et al. .................. 348/14.01 |
| 2007/0123251 A1 | 5/2007 | McElvaney |
| 2007/0139182 A1 | 6/2007 | O'Connor et al. |
| 2008/0055053 A1* | 3/2008 | Hanyu .......................... 340/326 |
| 2008/0104690 A1* | 5/2008 | Hirai et al. ...................... 726/14 |
| 2009/0111083 A1 | 4/2009 | Feder |
| 2009/0191840 A1* | 7/2009 | Piett et al. .................. 455/404.1 |
| 2009/0221262 A1* | 9/2009 | Miwa et al. ................ 455/404.1 |
| 2009/0298469 A1* | 12/2009 | Kim et al. .................... 455/411 |
| 2010/0093405 A1* | 4/2010 | Ewell et al. .................. 455/566 |

\* cited by examiner

METHOD FOR SELF-CALLING AND EMERGENCY REPORTING WITH MOBILE TERMINAL, SYSTEM THEREOF, AND RECORDING MEDIUM STORING THE SAME

CROSS REFERENCE TO RELATED APPLICATIONS

The present application is a national phase entry under 35 U.S.C. §371 of International Application No. PCT/KR2010/0000406, filed Jan. 22, 2010, published in Korean, which claims priority from Korean Patent Application No. 10-2009-0123042, filed Dec. 11, 2009. The disclosures of said applications are incorporated by reference herein.

TECHNICAL FIELD

The present invention relates to mobile security, and particularly, relates to a method of self-calling and emergency reporting by input of a particular pattern to allow a mobile terminal to output a pre-input voice or image, drive a countermeasure according to a stored query and response to call attention to one's surroundings, and induce a guardian and a security company to react swiftly, a system thereof, and a recording medium storing the same.

BACKGROUND ART

Humans' efforts for protecting tangible/intangible property or possessions have continuously developed, and the range of security has been diversified.

Security coverage, which has been limited to a safe provided in homes or offices to keep valuables therein, prevention of computer hacking, a guard or escort for personal safety to protect security of celebrities or public figures, or the like, has expanded to on-site monitoring closed circuit TV, an access control system, a burglar alarm system, a stolen vehicle tracking system, and even a fence security system for protecting important facilities.

A positioning service of members using a mobile communication terminal used for an emergency reaction service includes a GPS (global positioning system) scheme, a GPSOne scheme provided by mobile carriers, and the like, and recently, DGPS (differential GPS), a scheme of obtaining more accurate location by correcting factors causing an error by using reference point coordinates which are already known as a relative positioning type of GPS measurement scheme and maximally reducing an error is about to be commercialized.

Currently provided mobile security services employ a method allowing a subscriber having an emergency to press a particular emergency rescue button configured in a terminal or directly make a call to a guardian or a security company to inform them about the emergency.

However, in the case of such a security service, the emergency rescue buttons is required to be configured in the mobile terminal itself, and here, there is not much demand for such a functional mobile terminal, making it difficult for manufacturers to positively manufacture the mobile terminals, and in line with the recent trend of considering design very highly, popularization of functional mobile terminals is hardly anticipated.

In addition, in order for a user to inform someone about an emergency through a call, the user should select a person to receive his or her call with a call button, and such manipulation is substantially impossible in an emergency.

DISCLOSURE

Technical Problem

The present invention has been made in an effort to provide a method of self-calling and emergency reporting by input of a predetermined pattern to allow a mobile terminal to output a pre-input voice or image, drive a countermeasure according to a stored query and response to call attention to surroundings, and induce a guardian and a security company to react swiftly.

The present invention has also been made in an effort to provide a system of self-calling and emergency reporting with a mobile terminal setting by employing a method of self-calling and emergency reporting.

Further, the present invention has also been made in an effort to provide a recording medium storing a method of self-calling and emergency reporting, as a program that can be executed in a computer.

Technical Solution

An exemplary embodiment of the present invention provides a method of self-calling and emergency reporting. The method includes: (a) when a particular pattern of a user is input to a mobile terminal, determining, by the mobile terminal, whether or not the particular pattern is authentication data previously input by the user; (b) when the particular pattern is authentication data previously input by the user, changing a mode of the mobile terminal to a self-reception mode previously determined by the user; (c) outputting a query previously stored in a database to the user through the mobile terminal to perform voice recognition; (d) executing a policy previously stored in the database according to the user's voice recognition and a response pattern according to the query; and (e) changing a mode of the mobile terminal to a standby mode when a personal identification number for termination is input.

Here, the particular pattern may include at least one among a motion pattern of the mobile terminal, a keypad input pattern of the mobile terminal, a touch pattern of the mobile terminal, an emergency button input of the mobile terminal, and the user's voice.

The step (a) may include: comparing a user's particular pattern input to the mobile terminal with authentication data of the user previously stored in the database to check whether or not they are identical; and when the particular pattern and the user's input data are identical, performing user authentication.

Also, the step (b) may include changing a mode of the mobile terminal to a bell sound mode and changing a volume of a bell sound of the mobile terminal to a predetermined volume of a bell sound.

Here, the step (b) may include, when the particular pattern is authentication data previously input by the user, changing a mode of the mobile terminal to a bell sound mode, and when the mode of the mobile terminal is changed to the bell sound mode, changing a bell sound of the mobile terminal to a bell sound and a volume of a bell sound stored in the database.

Meanwhile, the step (b) may include automatically executing a particular program installed in the mobile terminal or transmitting an emergency rescue message by the mobile terminal.

In addition, the step (b) may include outputting a bell sound from the mobile terminal which has been changed to the self-reception mode, and checking whether a call incoming is performed; when the call incoming is performed, interrupting an output of a bell sound according to an external call and recording a sell-calling state in the database; when the call incoming is performed, determining whether or not a phone number of the external call is identical to a phone number stored in the database; and when the phone number of the external call is identical to the phone number stored in the database, changing a mode of the mobile terminal to a three-party call mode, and when the phone number of the external call is different from the phone number stored in the database, interrupting the external call.

The step (c) may include: outputting the query stored in the database to the user; when the user's voice is input according to the query, determining whether or not the user's voice according to the query is identical to the user's voice previously stored in the database; and when the user's voice according to the query is identical to the user's voice previously stored in the database, checking user's response information.

The step (e) may include after the policy stored in the database is executed, terminating the self-reception mode of the mobile terminal.

In addition, the step (e) may include, when data different from the user's specific personal identification number is input to the mobile terminal, maintaining the self-reception mode.

Meanwhile, the database may include a memory installed in the mobile terminal or an external database server.

In addition, the step (b) may include, when the particular pattern is authentication data previously input by the user: storing at least one of user data among the user's current location information, the user's phone number, the user's input voice, and video data input to a camera module of the mobile terminal in the database; and transmitting the user data to a third party previously stored in the database.

Another exemplary embodiment of the present invention provides a system of self-calling and emergency. The system includes: a data input unit for receiving a particular pattern from a user when an emergency occurs, receiving a response of the user according to a query previously stored in a database, and receiving a personal identification number of the user for termination; a controller for determining whether or not the input particular pattern is authentication data previously input by the user to perform user authentication, changing a mode of the mobile terminal to a self-reception mode which is a mode previously input to the database according to the user authentication, executing a policy stored in the database according to the user's voice recognition and response pattern, and transmitting user data including information regarding the user's current location to a third party previously input to the database; and a voice recognition unit for performing voice recognition based on the user's response according to the query previously stored in the database.

Here, the particular pattern may include at least one among a motion pattern of the mobile terminal, a keypad input pattern of the mobile terminal, a touch pattern of the mobile terminal, an emergency button input of the mobile terminal, and the user's voice.

The controller may include a main controller for checking whether or not the input particular pattern is authentication data previously input by the user to perform user authentication, and executing the policy stored in the database according to the user's voice recognition and response pattern; a reception controller for changing the mode of the mobile terminal to the self-reception mode as a mode previously input to the database according to the user authentication; and a communication controller for transmitting the user data including the information regarding the user's current location to a third party previously input to the database.

Here, the reception controller may change the mode of the mobile terminal to a bell sound mode, and change a volume of the bell sound to a predetermined size.

Meanwhile, the user data of the communication controller may include at least one of user data among the information regarding the user's current location, the user's phone number, the user's input voice, and video data input to a camera module of the mobile terminal.

Also, when the particular pattern is authentication data previously input by the user, the main controller may automatically execute a particular program installed in the mobile terminal or transmit an emergency rescue message by the mobile terminal.

In addition, the communication controller may check call incoming by the user when a reception tone is sent to the mobile terminal according to the change to the self-reception mode, interrupt an output of a bell sound by an external call and record a self-call state in the database when the call incoming is performed, check whether or not a phone number of the external call is identical to a phone number stored in the database, and when the phone number of the external call is identical to the phone number stored in the database, change the mode of the mobile terminal to a three-party call mode, and interrupt the incoming of the external call when the phone number of the external call is different from the phone number stored in the database.

Also, when the user's voice is input according to the query stored in the database, the voice recognition unit may determine whether or not the user's voice according to the query and a user's voice previously stored in the database are identical, and when the user's voice according to the query and a user's voice previously stored in the database are identical, the voice recognition unit may check the user's response information.

Meanwhile, after the main controller executes the policy stored in the database, the main controller may terminate the self-reception mode of the mobile terminal.

Yet another embodiment of the present invention provides a recording medium storing the foregoing method of self-calling and emergency reporting using a mobile terminal, as a program that can be executed in a computer Advantageous Effects According to embodiments of the present invention, without having to change hardware of a mobile terminal or actually manipulate a call button of a mobile terminal, a user may perform self-calling by inputting a particular pattern and call incoming is simultaneously executed according to input of the particular pattern, thus swiftly reacting to an emergency. Also, since a call reception tone can be explicitly known to the outside to call attention to the surroundings, a criminal psychology of a person can be suppressed. An emergency can be promptly coped with by simply responding to a control command of a database storing pre-set type data.

MODE FOR INVENTION

Figure 1:
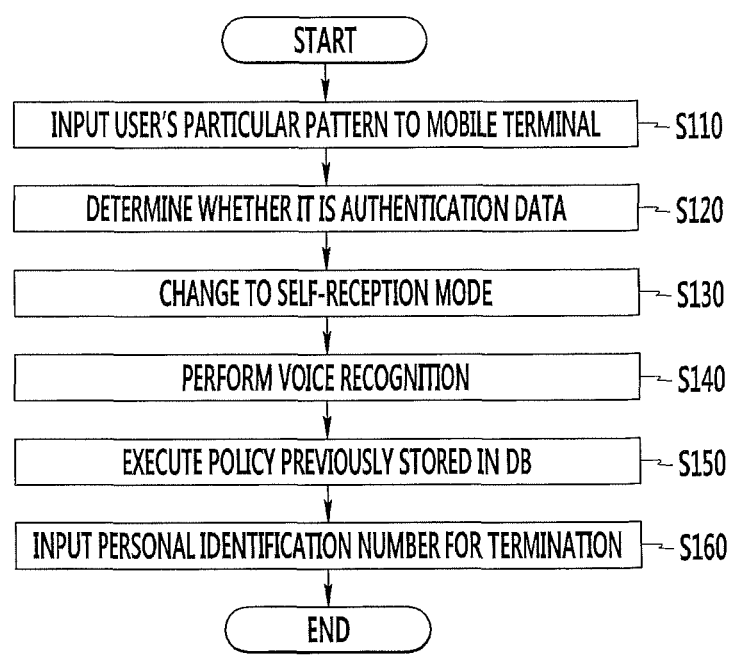
FIG. 1 shows a flowchart of a method of self-calling and emergency reporting using a mobile terminal according to an embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms such as "-er", "-or", and "module" described in the specification mean units for processing at least one function and operation and can be implemented by hardware components or software components and combinations thereof.

Next, embodiments of the present invention will be described in detail with reference to the accompanying drawings.

FIG. 1 shows a flowchart of a method of self-calling and emergency reporting using a mobile terminal according to an embodiment of the present invention.

An interface of the mobile terminal may include a microphone, an input port, a motion sensor, a camera, a GPS, and the like as an input unit, may include a speaker, an LED, and an LCD, as an output unit, and may include CDMA, WCDMA, GSM, 3G, and 4G as a communication unit.

Referring to FIG. 1, when a user is placed in an emergency or dangerous situation, the user inputs a predetermined particular pattern to a mobile terminal (S110). When the particular pattern is input to the mobile terminal, it is determined whether the input particular pattern is authentication data pre-stored in the mobile terminal by the user (S120).

To determine whether the input particular pattern is the authentication data, a particular pattern is previously stored in a memory of the mobile terminal or an external server. The particular pattern is compared with the pattern input by the user when the user inputs the pattern, and it is determined that the input pattern is equal to the previously input authentication data when the particular pattern and the input pattern are identical.

Meanwhile, for the disambiguation of the detailed description of the embodiment of the present invention, the memory of the mobile terminal or the external server will be referred to as "a database".

Here, the particular pattern includes at least one among a mobile terminal's motion pattern by a user, a keypad of a mobile terminal, a touch pattern of a mobile terminal, an emergency button of a mobile terminal, and a voice input by a user.

Here, it is described that "predetermined particular pattern information is input", and this is the same as a process of performing a "predetermined particular pattern behavior" by the user and recognizing the same by the mobile terminal.

For example, the particular pattern information may be received through a microphone by repeatedly pressing a particular key or a touch pad (toot, toot, too~woo) or by flapping (tick, tick, tic~ik) a surrounding portion of the mobile terminal at certain periods, and this method may be variably modified by a skilled person in the art according to aspects or designs of embodiments of the present invention.

It is substantially impossible to perform an operation of pressing a button to activate the mobile terminal in order to notify about an emergency rescue or an emergency. In consideration of this, according to the embodiments of the present invention, a mobile terminal is activated by simply inputting a particular pattern.

When the input particular pattern is authentication data previously input by the user, a user mode of the mobile terminal is changed to a self-reception mode as a mode previously determined by the user (S130).

Then, a query previously stored in the database is output to the user through the mobile terminal to perform voice recognition (S140).

As for the query, a query previously established in the database to perform self-calling and emergency reporting may be selected, or a response pattern with respect to the query may be previously designated.

Thus, when a real-life situation takes place, the query previously stored in the database is output, and when the user makes a previously designated format of answer, the mobile terminal may perform voice recognition of the user's voice and output a response pattern as described hereinafter as well.

Thereafter, a policy previously stored in the database is executed according to the user's voice recognition and response pattern (S150).

When the user's voice recognition is successfully performed, the policy previously stored in the database is output to the mobile terminal, and when the user makes a predetermined format of answer such as "Yes", "No", "Let me see", or the like, reacting to the situation is performed according to the previously stored policy. Detailed description thereof will be described later with reference to FIG. 6.

When a personal identification number for termination is input by the user, the mobile terminal is changed to a standby mode (S160).

The policy previously stored in the database may be performed according to the user's voice recognition and response pattern, and when the performing of the policy is completed, the user may input a personal identification number (PIN) for termination to change the mobile terminal to a standby mode.

The process of inputting the PIN for termination to change the mobile terminal to a standby mode is performed because a threatening person may forcibly take the user's mobile terminal to terminate it.

Although the threatening person forcibly performs termination, the mobile terminal waits for inputting of the PIN for termination by the user for a predetermined time even after the performing of the policy is terminated, as long as the PIN for termination is not input.

Here, although the threatening person forcibly releases a battery, a self-power supply process within the mobile terminal may be driven or an extra auxiliary battery may be used to actually transmit the user's location information, personal information, surrounding voice information, and video data to a third party such as a predetermined guardian, or the like, a security company, or police.

Figure 2:
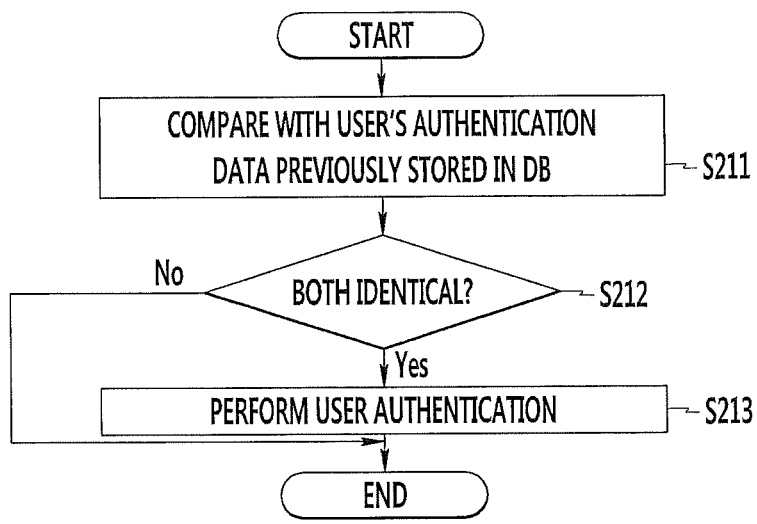
FIG. 2 shows a detailed flowchart illustrating a step (S120) for determining whether there is authentication data in the method shown in FIG. 1.

FIG. 2 shows a detailed flowchart illustrating a step (S120) for determining whether there is authentication data in the method shown in FIG. 1.

Referring to FIG. 2, it is determined whether the particular pattern input by the user is authentication data input to the database by the user (S211).

When the particular pattern input by the user is identical to the authentication data (S212), user authentication is performed (S213).

If the particular pattern input by the user is not identical to the authentication data, the particular pattern input by the user is disqualified as data with respect to user authentication.

In order to determine whether the predetermined input by the user is identical to the authentication data input to the database by the user, a construction for activating the mobile terminal in a standby mode is needed.

For this, in the embodiments of the present invention, a driving process according to an embodiment of the present invention may be input to a registry of a start program of the mobile terminal to operate the mobile terminal any time, and by associating the driving process of an embodiment of the present invention to an activation button of the mobile terminal in the standby mode, the mobile terminal may be executed.

Figure 3:
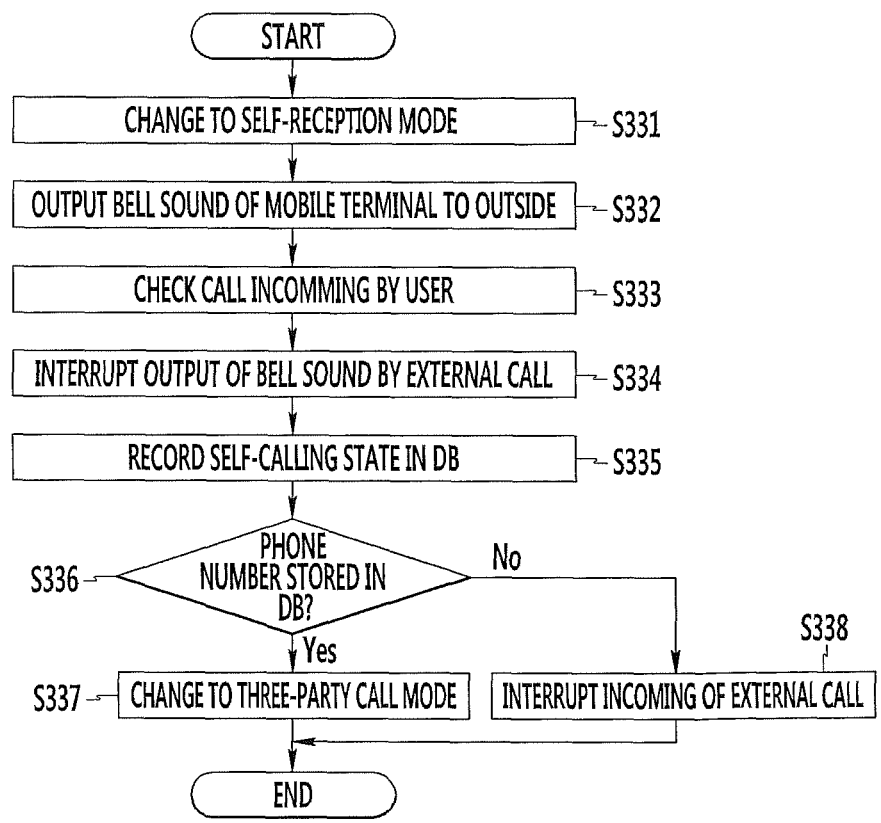
FIG. 3 shows a detailed flowchart illustrating a step (S130) for self-reception mode changing in FIG. 1.

FIG. 3 shows a detailed flowchart illustrating a step (S130) for self-reception mode changing in FIG. 1.

Referring to FIG. 3, when the user authentication is performed by the particular pattern input by the user being equal to the authentication data, the mobile terminal is changed to a self-reception mode (S331). The self-reception mode will be described later with reference to FIG. 4.

When the mobile terminal is changed to a self-reception mode, a bell sound of the mobile terminal is output to the outside (S332). This is to make the threatening person think that there is a phone call for the user in the situation in which the user is in danger, and call incoming is required to be explicitly notified to the outside in order to call attention to the surroundings.

In this manner, in order to output a bell sound to the outside, the user may determine a bell sound and an output value of the bell sound in preparation for an emergency and store the same in the database in advance, and when the database receives a request for outputting the bell sound through user authentication, the database may automatically output the bell sound to the outside through the mobile terminal.

Meanwhile, when the mobile terminal confirms that the user receives a call (S333), the mobile terminal interrupts the bell sound output caused by an external call (S334).

This is to prevent an occurrence of a situation in which, while the user performs the process of making an inquiry to the user through the mobile terminal according to the previously determined policy, the fact that the current call reception by the user is false is recognized when a call from a third party is received in actuality.

Thus, when the mobile terminal confirms when the user receives a call (S333), the mobile terminal interrupts a bell sound output caused by an external call (S334) and records a self-calling state in the database to thus make preparation for a case in which a call is received from a third party.

Meanwhile, when a call is received from the third party, it is checked whether or not the call is from a phone number stored in the database (S336), and when the call is a phone number stored in the database, the mobile terminal is changed to a three-party call mode (S337). In this manner, when a call corresponding to the same phone number as that stored in the database is received, the mobile terminal is changed to the three-party call mode to inform about the current situation to the outside.

When the mobile terminal is changed to the three-party call mode, the mobile terminal of the user may simultaneously transmit situation information indicating that the user is currently having an emergency, information regarding a location of the user, and information regarding external video of the user to a counterpart who performs the three-party call mode.

Meanwhile, when the call is not from a phone number stored in the database, the external call is interrupted (S338).

Figure 4:
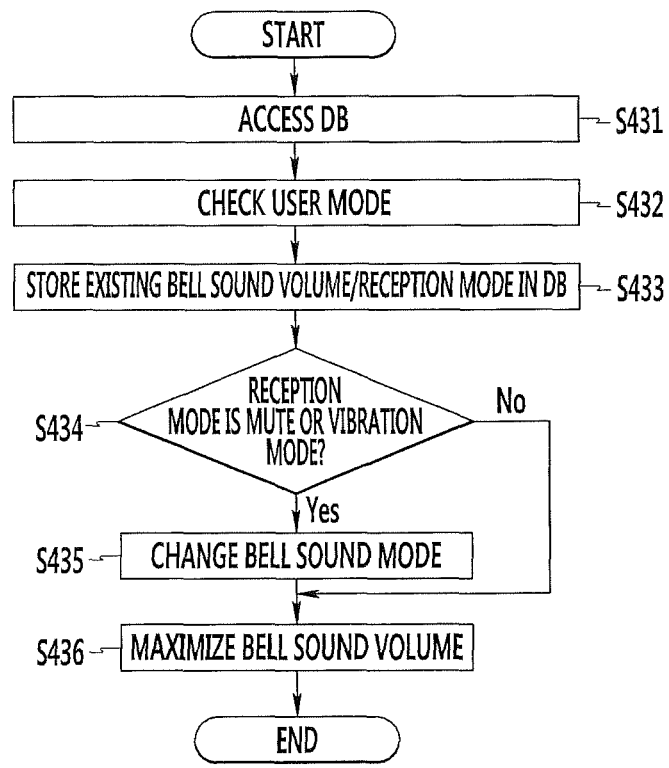
FIG. 4 shows a detailed flowchart illustrating a step (S331) for self-reception mode changing shown in FIG. 3.

FIG. 4 shows a detailed flowchart illustrating a step (S331) for self-reception mode changing shown in FIG. 3.

Referring to FIG. 4, first, a user database is accessed by the controller of the mobile terminal (S431) and a user mode is checked (S432).

Here, information regarding whether or not a current user mode of the mobile terminal is a bell sound mode and a current value of the bell sound volume of the mobile terminal are stored in the database (S433).

Meanwhile, when a reception mode of the mobile terminal is a mute or vibration mode (S544), the mobile terminal is changed to a bell sound mode (S435), and then the volume of the bell sound is changed to be maximized (S436).

When the reception mode of the user's mobile terminal is the bell sound mode, the volume of the bell sound is changed to be maximized (S436).

Namely, the self-reception mode corresponds to a mode previously stored by the user in the database, and may include information regarding whether or not the call reception mode of the mobile terminal is the bell sound mode, the vibration mode, or the mute mode, information regarding the value of the volume of the bell sound, and information regarding interruption of call reception from a third party.

The self-reception mode according to an embodiment of the present invention may include a bell sound mode, a maximum volume of bell sound, and setting of the mobile terminal with respect to interruption of call reception from a third party not stored in the database.

Figure 5:
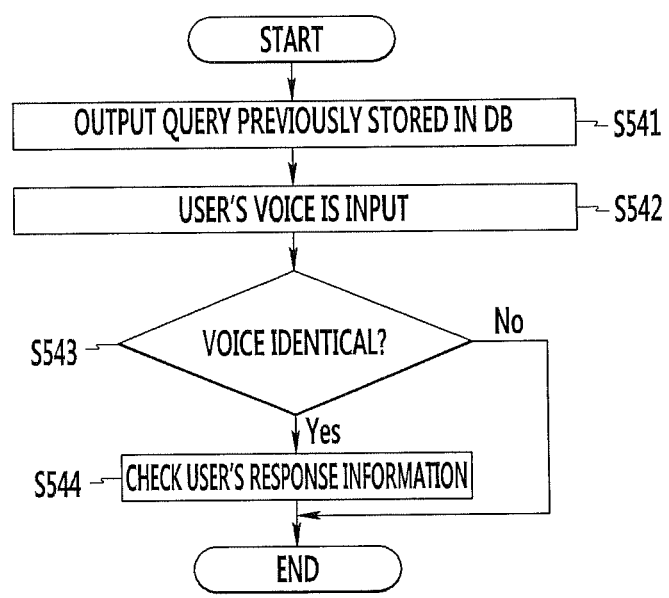
FIG. 5 shows a detailed flowchart illustrating a step (S140) for recognizing voice in FIG. 1.

FIG. 5 shows a detailed flowchart illustrating a step (S140) for recognizing voice in FIG. 1.

Referring to FIG. 5, the query stored in the database is output to the user (S541), and when a user's voice is input according to the output query (S542), it is determined whether or not the user's voice according to the query and the user's voice previously stored in the database are identical (S543). When the user's voice according to the query and the user's voice previously stored in the database are identical, the user's response information is checked (S544).

Figure 6:
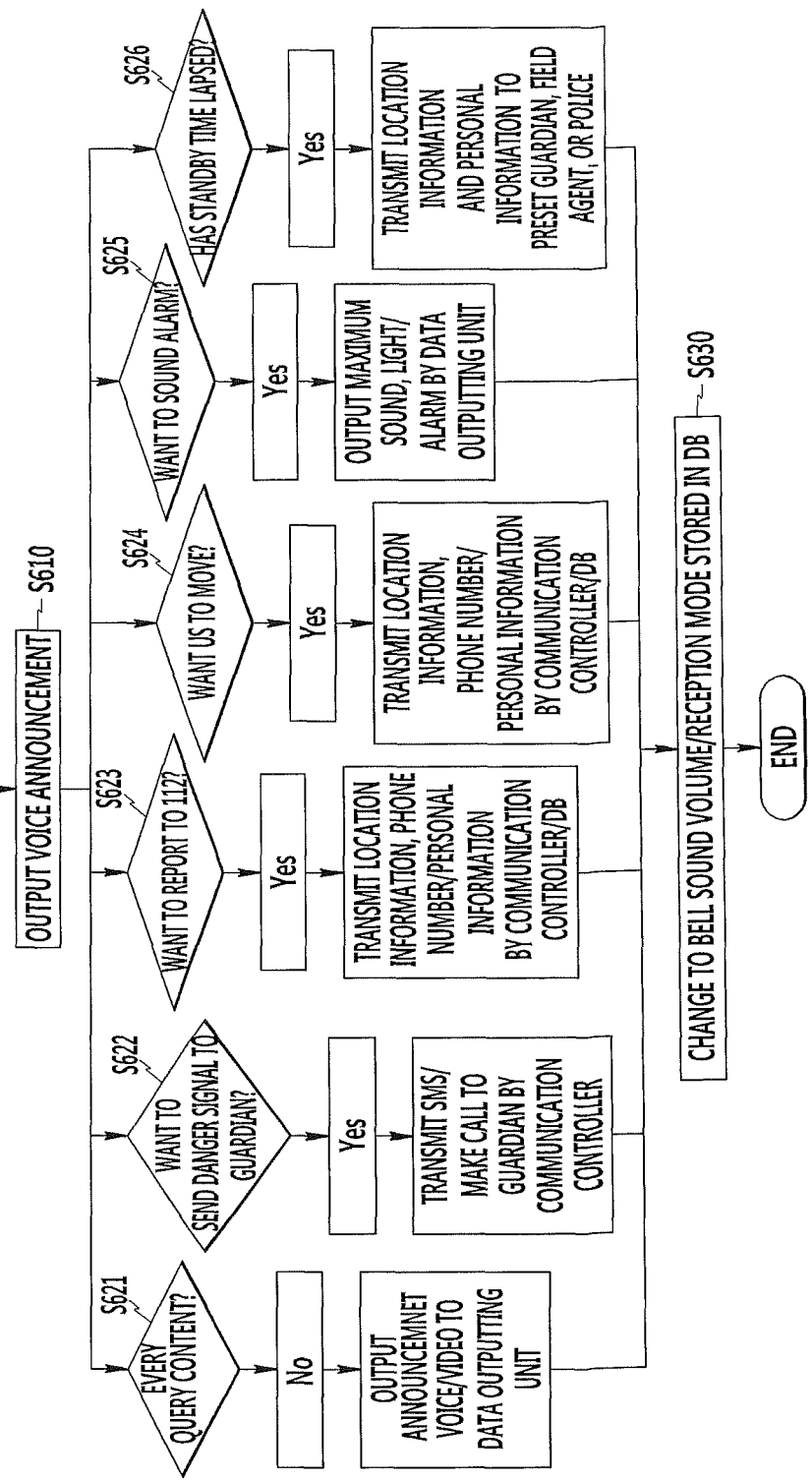
FIG. 6 shows a detailed flowchart illustrating a step (S150) for executing a policy in FIG. 1.

FIG. 6 shows a detailed flowchart illustrating a step (S150) for executing a policy in FIG. 1.

Referring to FIG. 6, upon authenticating the user, a voice announcement is output, and the voice announcement may be as follows.

Here, when the user answers all of the queries as No, an announcement voice or video is output to a data output unit.

When the user says "Yes" with respect to an announcement "Want to send a danger signal to guardian?" (S622), a communication controller informs the guardian accordingly through an SMS or a call.

Of course, at the same time, information regarding a current location of the user, surrounding photograph information, surrounding video information, or surrounding voice information may also be transmitted together.

When the user says "Yes" with respect to an announcement "Want to report to 112?" (S623), the communication controller informs the guardian accordingly through an SMS or a call and simultaneously transmits user's location information, phone number, personal information, and the like, to the police or a security company.

When the user says "Yes" with respect to an announcement "Want us to move?" (S624), the communication controller informs the guardian accordingly through an SMS or a call and simultaneously transmits the user's location information, phone number, personal information, and the like, to the security company.

When the user says "Yes" with respect to an announcement "Want to sound an alarm?" (S625), an alarm may be output with a maximal bell sound of the mobile terminal or a light source may be beamed by using the mobile terminal itself.

Meanwhile, when a standby time has lapsed (S626), the user's location information or personal information may be transmitted to a predetermined guardian, field agent, or the police.

That is, when the user is in a very dangerous situation, the user may not be able to answer. Thus, the user may set a standby time in advance, and thereafter, when there is no answer from the user during the pre-set standby time, the pre-set guardian, the field agent, or the police may be informed that the user is in a very dangerous situation, and thereby it is possible to protect the user.

Figure 7:
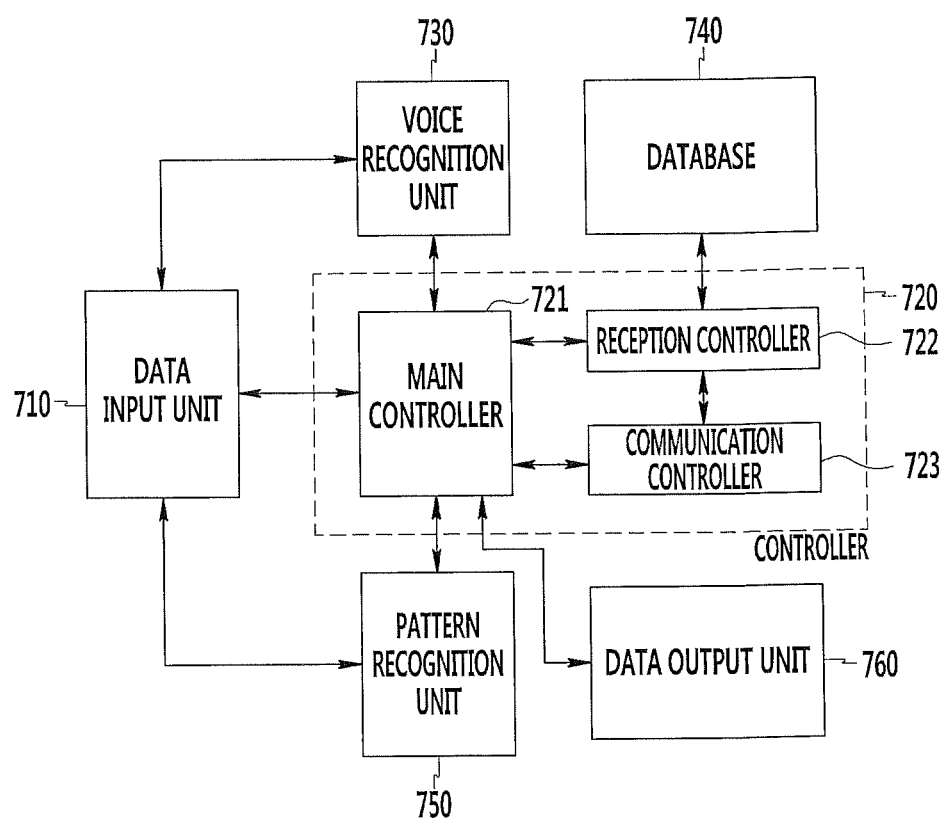
FIG. 7 shows a block diagram of a system for self-calling and emergency reporting with a mobile terminal according to an embodiment of the present invention.

FIG. 7 shows a block diagram of a system of self-calling and emergency reporting with a mobile terminal according to an embodiment of the present invention.

In describing the system of self-calling and emergency reporting by setting a time in a mobile terminal, repeated matters as those described above will be omitted for clarification of the present invention.

With reference to FIG. 7, the system of self-calling and emergency reporting using a mobile terminal may include a data input unit 710, a controller 720, a voice recognition unit 730, a database 740, a pattern recognition unit 750, and a data output unit 760.

The controller 720 may include a main controller 721, a reception controller 722, and a communication controller 723.

The data input unit 710 receives a particular pattern input by the user in the occurrence of an emergency, receives a user's response according to a query previously stored in the database, and receives the user's personal identification number for termination.

Here, inputting of a particular pattern refers to performing an "agreed particular pattern behavior" by the user and recognizing the same by the mobile terminal.

In order to determine whether or not the particular pattern is authentication data which has been previously input by the user, particular pattern information may be previously stored in the memory of a mobile terminal or an external interface server, and when the particular pattern is input by the user, it is compared with the stored particular pattern information. When the particular pattern input by the user is identical to the stored particular pattern information, it is determined that the particular pattern input by the user is the same as the previously input authentication data.

Here, the particular pattern may include at least one among a motion pattern of the mobile terminal, a keypad input pattern of the mobile terminal, a touch pattern of the mobile terminal, an emergency button input of the mobile terminal, and a particular voice input by the user.

The controller 720 checks whether or not the input particular pattern is authentication data previously input by the user to perform user authentication, changes a user mode of the mobile terminal to a self-reception mode, which is a mode previously input to the database, through user authentication, executes the policy stored in the database according to the user's voice recognition and response pattern, and transmits user data including the user's current location information to a third party previously input to the database.

The voice recognition unit 730 performs voice recognition based on the user's response to the query previously stored in the database.

The controller 720 may include the main controller 721 configured to check whether or not the input particular pattern is authentication data previously input by the user to perform user authentication and execute the policy stored in the database according to the user's voice recognition and response pattern, the reception controller 722 configured to change the user mode of the mobile terminal to the self-reception mode, a mode previously input to the database, through the user authentication, and the communication controller 723 configured to transmit user data including the user's current location information to a third party previously input to the database.

Meanwhile, the reception controller 722 may change a mode of the mobile terminal to a bell sound mode, and change the value of the bell sound of the mobile terminal to a predetermined value.

Also, the user data of the communication controller 723 may include at least one of the user's current location information, the user's phone number, the user's input voice, a still image input to a camera module of the mobile terminal, and video data.

When the particular pattern is authentication data previously input by the user, the main controller 721 may automatically execute a particular program installed in the mobile terminal or transmit an emergency rescue message by the mobile terminal.

When a bell sound is output to the mobile terminal according to the change of the mobile terminal to the self-reception mode, the communication controller 723 checks the incoming call from the user, and when the call incoming is performed, the communication controller 723 interrupts output of a bell sound according to an external call, records the self-calling state in the database, and checks whether or not a phone number of the external call is identical to a phone number stored in the database. When the phone number of the external call is identical to a phone number stored in the database, the communication controller 723 changes the mobile terminal to a three-party call mode. When the phone number of the external call is different from a phone number stored in the database, the communication controller 843 may interrupt the external call.

Also, the use's voice is input according to the query stored in the database, the voice recognition unit 730 determines whether or not the user's voice according to the query is identical to the user's voice previously stored in the database. When the user's voice according to the query is identical to the user's voice previously stored in the database, the voice recognition unit 730 checks the user's response information.

The main controller 721 may execute the policy stored in the database, and then terminate the self-reception mode of the mobile terminal.

Figure 8:
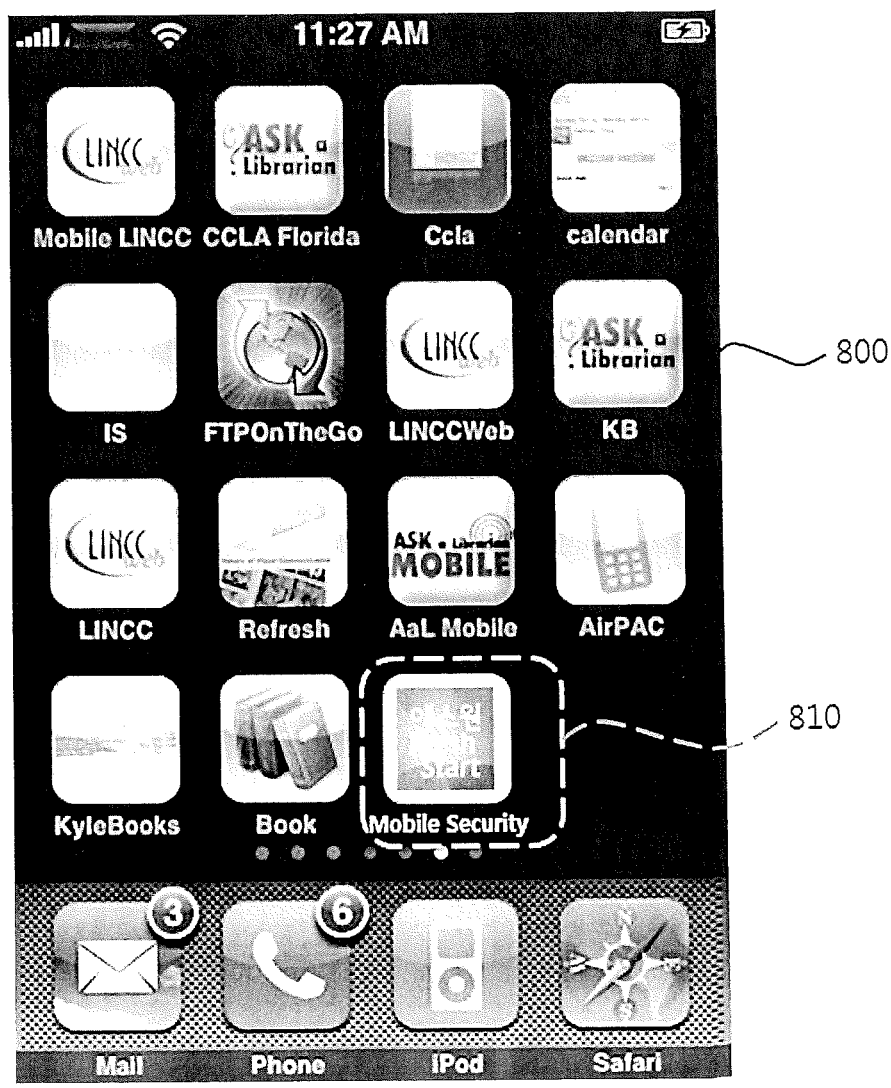
FIG. 8 is a view illustrating an embodiment of the system for self-calling and emergency reporting by setting a time in a mobile terminal according to an embodiment of the present invention.

FIG. 8 is a view illustrating an embodiment of the system of self-calling and emergency reporting by setting a time in a mobile terminal according to an embodiment of the present invention.

Referring to FIG. 8, first, the user downloads a program posted in a mobile store by a security company to the mobile terminal and installs it in the mobile terminal.

Currently, mobile stores are largely operated on a smart phone basis, and smart phone app stores are as shown in Table 1 below.

TABLE 1

| OS | Company | App store | Terminal |
| --- | --- | --- | --- |
| RIM | Research In Motion | Blackberry App world | Blackberry BOLD 9000 |
| Symbian | Nokia | Ovi store | Nokia 5800 Xpress |
| Android | Google | Android market | Motorola Droid |
| Windows mobile | Microsoft | Windows mobile market place | Sony Ericsson XPERIA, SAMSUNG OMNIA, LG INSITE |
| Windows mobile | Samsung | Bada | OMNIA 2 |
| iPhone OS | Apple | App for iPhone | iPhone |

App for iPhone based on Apple operated by Apple Inc., Bada based on Windows Mobile for Samsung Co., Ltd., Android Market based on Android for Google, and the like, are operated as representative smart phone app stores, and the user may purchase a particular program through the smart phone app stores and install the same.

The user may perform the self-calling and emergency reporting according to an embodiment of the present invention by directly executing a program icon 810 according to a program installed on the screen 800 of the mobile terminal, or may input the particular pattern as described above to automatically execute the program.

The method of self-calling and emergency reporting by setting a time in a mobile terminal according to embodiments of the present invention may be executed through software. When executed by software, the constituent elements of the embodiments of the present invention are code segments executing required operations.

Programs or code segments may be stored in a processor readable medium or transmitted by a computer data signal combined with a carrier in a transmission medium or a communication network.

The computer readable recording medium includes all types of recording devices storing data readable by computer systems. Examples of the computer readable recording medium include ROM, RAM, CD-ROM, DVD±ROM, DVD-RAM, magnetic tapes, floppy disks, hard disks, Blu-ray discs, optical data storage devices, and the like.

The computer readable recording medium may also be distributed to computer devices connected by a network so that the computer readable codes are stored and executed in a distributed fashion.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of self-calling and emergency reporting, the method comprising:
   (a) when a particular pattern of a user is input to a mobile terminal, determining, by the mobile terminal, whether or not the particular pattern is authentication data previously input by the user;
   (b) when the particular pattern is the authentication data previously input by the user, changing a mode of the mobile terminal to a self-reception mode previously determined by the user;
   (c) outputting a query previously stored in a database to the user through the mobile terminal to perform voice recognition;
   (d) executing a policy previously stored in the database according to the user's voice recognition and a response pattern according to the query, wherein the policy includes notifying a third party when a response to the query has not been received within a predetermined time; and
   (e) inputting a personal identification number to terminate the self-reception mode and place the mobile terminal in a standby mode.

2. The method of claim 1, wherein the particular pattern includes at least one selected from the group consisting of a motion pattern of the mobile terminal, a keypad input pattern of the mobile terminal, a touch pattern of the mobile terminal, an emergency button input of the mobile terminal, and the user's voice.

3. The method of claim 1, wherein the step (a) includes:
   comparing the user's particular pattern input to the mobile terminal with the authentication data of the user previously stored in the database to check whether or not they are identical; and
   when the particular pattern and the user's input data are identical, performing user authentication.

4. The method of claim 1, wherein the step (b) includes changing the mode of the mobile terminal to a bell sound mode and changing a volume of a bell sound of the mobile terminal to a predetermined volume of the bell sound.

5. The method of claim 1, wherein the step (b) includes:
   when the particular pattern is the authentication data previously input by the user, changing a mode of the mobile terminal to a bell sound mode; and
   when the mode of the mobile terminal is changed to the bell sound mode, changing a bell sound of the mobile terminal to a bell sound and a volume of the bell sound stored in the database.

6. The method of claim 1, wherein the step (b) includes automatically executing a particular program installed in the mobile terminal or transmitting an emergency rescue message by the mobile terminal.

7. The method of claim 1, wherein the step (b) includes:
   outputting a bell sound from the mobile terminal which has been changed to the self-reception mode, and checking whether a call incoming is performed;
   when the call incoming is performed, interrupting an output of the bell sound according to an external call and recording a self-calling state in the database;
   when the call incoming is performed, determining whether or not a phone number of the external call is identical to a phone number stored in the database; and
   when the phone number of the external call is identical to the phone number stored in the database, changing a mode of the mobile terminal to a three-party call mode, and when the phone number of the external call is different from the phone number stored in the database, interrupting the external call.

8. The method of claim 1, wherein the step (c) includes:
outputting the query previously stored in the database to the user;
when the user's voice is input according to the query, determining whether or not the user's voice according to the query is identical to the user's voice previously stored in the database; and
when the user's voice according to the query is identical to the user's voice previously stored in the database, checking user's response information.

9. The method of claim 1, wherein the step (e) includes
after the policy previously stored in the database is executed, terminating the self-reception mode of the mobile terminal.

10. The method of claim 1, wherein the step (e) includes
when data different from the user's personal identification number is input to the mobile terminal, maintaining the self-reception mode.

11. The method of claim 1, wherein the database includes a memory installed in the mobile terminal or an external database server.

12. The method of claim 1, wherein the step (b) includes:
when the particular pattern is the authentication data previously input by the user, storing at least one of user data selected from the group consisting of the user's current location information, the user's phone number, the user's input voice, and video data input to a camera module of the mobile terminal in the database; and
transmitting the user data to a third party previously stored in the database.

13. A system of self-calling and emergency, the system comprising:
a data input unit for receiving a particular pattern from a user when an emergency occurs, receiving a response of the user according to a query previously stored in a database, and receiving a personal identification number of the user for termination of a self-reception mode;
a controller for determining whether or not the particular pattern is authentication data previously input by the user to perform user authentication, changing a mode of the mobile terminal to the self-reception mode which is a mode previously input to the database according to the user authentication, executing a policy stored in the database according to the user's voice recognition and response pattern, wherein the policy includes notifying a third party when a response to the query has not been received within a predetermined time, and transmitting user data including information regarding the user's current location to the third party previously input to the database; and
a voice recognition unit for performing voice recognition based on the user's response according to the query previously stored in the database.

14. The system of claim 13, wherein the particular pattern includes at least one selected from the group consisting of a motion pattern of the mobile terminal, a keypad input pattern of the mobile terminal, a touch pattern of the mobile terminal, an emergency button input of the mobile terminal, and the user's voice.

15. The system of claim 13, wherein the controller includes:
a main controller for checking whether or not the particular pattern is the authentication data previously input by the user to perform user authentication, and executing the policy previously stored in the database according to the user's voice recognition and response pattern;
a reception controller for changing the mode of the mobile terminal to the self-reception mode as a mode previously input to the database according to the user authentication; and
a communication controller for transmitting user data including information regarding the user's current location to a third party previously input to the database.

16. The system of claim 15, wherein the reception controller changes the mode of the mobile terminal to a bell sound mode, and changes a volume of a bell sound to a predetermined value.

17. The system of claim 15, wherein the user data of the communication controller includes at least one selected from the group consisting of user data among the information regarding the user's current location, the user's phone number, the user's input voice, and video data input to a camera module of the mobile terminal.

18. The system of claim 15, wherein when the particular pattern is the authentication data previously input by the user, the main controller automatically executes a particular program installed in the mobile terminal or transmits an emergency rescue message by the mobile terminal.

19. The system of claim 15, wherein the communication controller
checks call incoming by the user when a reception tone is sent to the mobile terminal according to the change to the self-reception mode,
when the call incoming is performed, interrupts output of a bell sound by an external call and records a self-call state in the database,
checks whether or not a phone number of the external call is identical to a phone number stored in the database, and when the phone number of the external call is identical to the phone number stored in the database, changes the mode of the mobile terminal to a three-party call mode, and
when the phone number of the external call is different from the phone number stored in the database, interrupts the incoming of the external call.

20. The system of claim 13, wherein when the user's voice is input according to the query stored in the database, the voice recognition unit determines whether or not the user's voice according to the query and a user's voice previously stored in the database are identical, and when the user's voice according to the query and a user's voice previously stored in the database are identical, the voice recognizing unit checks the user's response information.

* * * * *